(12) United States Patent
Yue (10) Patent No.: US 9,989,706 B2
(45) Date of Patent: Jun. 5, 2018

(54) METHOD AND APPARATUS FOR PROVIDING MULTIPORT FREE-SPACE WAVELENGTH-DIVISION MULTIPLEXING (WDM) DEVICE USING A PRISM

(71) Applicant: OPTIWORKS, INC., Fremont, CA (US)

(72) Inventor: Xuefeng Yue, San Jose, CA (US)

(73) Assignee: OW Holding Inc., Grand Cayman (KY)

( * ) Notice: Subject to any disclaimer, the term of this patent is extended or adjusted under 35 U.S.C. 154(b) by 0 days. days.

(21) Appl. No.: 15/598,244

(22) Filed: May 17, 2017

(65) Prior Publication Data

US 2017/0254958 A1    Sep. 7, 2017

Related U.S. Application Data

(63) Continuation-in-part of application No. 14/852,542, filed on Sep. 12, 2015, now abandoned.

(60) Provisional application No. 62/098,996, filed on Dec. 31, 2014.

(51) Int. Cl.
*G02B 6/293* (2006.01)
*G02B 6/34* (2006.01)

(52) U.S. Cl.
CPC ....... *G02B 6/29367* (2013.01); *G02B 6/2938* (2013.01); *G02B 6/34* (2013.01)

(58) Field of Classification Search
CPC .......................... G02B 6/29367; G02B 6/2938
See application file for complete search history.

(56) References Cited

U.S. PATENT DOCUMENTS 6,870,976 B2 *  3/2005  Chen ................. G02B 6/29367
                                                                      264/1.1

\* cited by examiner

*Primary Examiner* — Jerry Rahll
(74) *Attorney, Agent, or Firm* — Intellectual Property Law Group LLP (57) ABSTRACT

A multiport free-space wavelength division multiplexing ("WDM") device is capable of handling multiple optical signals carried in multiple wavelengths ("$\lambda_n$") using a prism. The WDM device includes an input collimator, prism, and optical filter. The input collimator receives an optical beam containing multiple wavelengths $\lambda_n$ traveling through free-space. The prism uses at least two (2) surfaces to generate a first optical beam which travels in opposite direction of the optical beam. The optical filter is situated at a predefined angle with respect to the interface surface of the prism for facilitating frequency separation as well as extracts a first wavelength ("$\lambda_1$") from $\lambda_n$ to form a first light signal with $\lambda_1$ and form a second optical beam with the remaining wavelengths of $\lambda_n$. A collimator is used to guide the first light signal to a port.

7 Claims, 10 Drawing Sheets

METHOD AND APPARATUS FOR PROVIDING MULTIPORT FREE-SPACE WAVELENGTH-DIVISION MULTIPLEXING (WDM) DEVICE USING A PRISM

PRIORITY

This application is a continuation-in-part of and claims the benefit of priority to co-pending U.S. patent application having Ser. No. 14/852,542 filed on Sep. 12, 2015, in the name of the same inventor and entitled "Optical Fitler Subassembly for Compact Wavelength Demultiplexing Device," which further claims the benefit of priority of provisional application No. 62/098,996, filed on Dec. 31, 2014, and co-pending U.S. patent application having Ser. No. 14/852,540, filed on Sep. 12, 2015, in the name of the same inventor and entitled "Assembly of Standard DWDM Devices for Use on Free-Space Multiport DWDM Devices" which further claims the benefit of priority to Provisional Application No. 62/098,996, filed on Dec. 31, 2014, all mentioned U.S. applications are hereby incorporated herein by reference in their entirety.

FIELD

The exemplary embodiment(s) of the present invention relates to telecommunications network. More specifically, the exemplary embodiment(s) of the present invention relates to optical networking.

BACKGROUND

With increasing demand for more information to be supplied to homes and/or businesses, network providers are constantly adding, expanding, upgrading, and/or switching their networks to improve overall optical communications network(s). Optical communications networks typically offer high-speed voice, video, and data transmission between users, such as providers, residential homes, businesses, government agents, and/or networks. Conventional optical networks include, but not limited to, fiber to the node/neighborhood ("FTTN"), fiber to the curb ("FTTC"), fiber to the building ("FTTB"), fiber to the home ("FTTH"), fiber to the premises ("FTTP"), or other edge location to which a fiber network extends. With increasing speed and capacity, various optical devices such as wave-division multiplexing ("WDM") elements have been developed to manipulate optical signals, such as routing, splitting, merging, and/or dropping optical signals.

To route optical signals between various optical nodes or devices, a WDM system, for example, may be employed to handle optical signal routing. The WDM system, for certain applications, is able to multiplex a number of optical signals with different wavelengths onto a single optical fiber. A wavelength may also be referred as a frequency or a color capable of traveling across an optical fiber. Different wavelengths, for instance, can be generated by different lasers. With a WDM network environment, a typical fiber may be configured to carry multiple sets of network traffic using different traffic wavelengths. For instance, a fiber can be configured up to 88 channels wherein each channel can transmit a specific type of wavelength containing optical information.

A problem associated with a compact optical device such as a WDM device is that it is difficult to mount filters and mirror(s) in a small plate.

SUMMARY

One embodiment of the presently claimed invention discloses a multiport free-space wavelength division multiplexing ("WDM") device capable of handling multiple optical signals carried in multiple wavelengths ("$\lambda_n$") using a prism. The WDM device includes an input collimator, prism, and optical filter. The input collimator receives an optical beam containing multiple wavelengths $\lambda_n$ traveling through free-space. The prism uses at least two (2) surfaces to generate a first optical beam which travels in opposite direction of the optical beam. The optical filter is situated at a predefined angle with respect to the interface surface of the prism for facilitating frequency separation as well as extracts a first wavelength ("$\lambda_1$") from $\lambda_n$ to form a first light signal with $\lambda_1$ and form a second optical beam with the remaining wavelengths of $\lambda_n$. A collimator is used to guide the first light signal to a port.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described in context of a method and/or apparatus for node connectivity and port locations associated with optical networking device(s).

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

Communication network means any type of network that is able to transmit data in a form of packets, cells, or frames. A communication network may be, for example, an IP communication network or an IP network carrying traffic packed in cells such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may include one or more of a satellite network, a DVB-RCS (Digital Video Broadcasting-Return Channel System) network, an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, the evolution of the UMTS known as LTE (Long Term Evolution), or DVB-H (Digital Video Broadcasting-Handhelds)), a hybrid (satellite and terrestrial) network, and/or an optical network.

In a WDM system, different colors of light, for example, are combined by a WDM multiplexing device and multiplexed onto a single fiber strand wherein each color of wavelength can be called a channel. On the receiving side, each color, on the other hand, is separated into its own channel by using a WDM demultiplexing device. Thin film filters are used as optical filters to pass and/or reflect desired wavelengths. In one example, thin film filter based WDM's can be cascaded to obtain a higher-channel number, such as 4, 8, 16, and 32 channels.

One embodiment of the present invention discloses a multiport free-space wavelength division multiplexing ("WDM") device using a prism to facilitate directing and/or separating optical signals with multiple wavelengths ("$\lambda_n$"). The WDM device, such as a WDM demultiplexer, includes an input collimator, prism, and optical filter. The input collimator, for example, receives an optical beam containing multiple wavelengths $\lambda_n$ traveling through free-space. The prism uses at least two (2) surfaces to generate a second optical beam which travels in opposite direction of the first optical beam. The optical filter situated at a predefined angle with respect to the interface surface of the prism for facilitating frequency separation and configured to extract a first wavelength ("$\lambda_1$") from the $\lambda_n$ to form first light signal with $\lambda_1$ and form a third optical beam with the remaining of $\lambda_n$. A collimator is used to guide the first light signal with the $\lambda_1$ to a port of WDM device.

Figure 1:
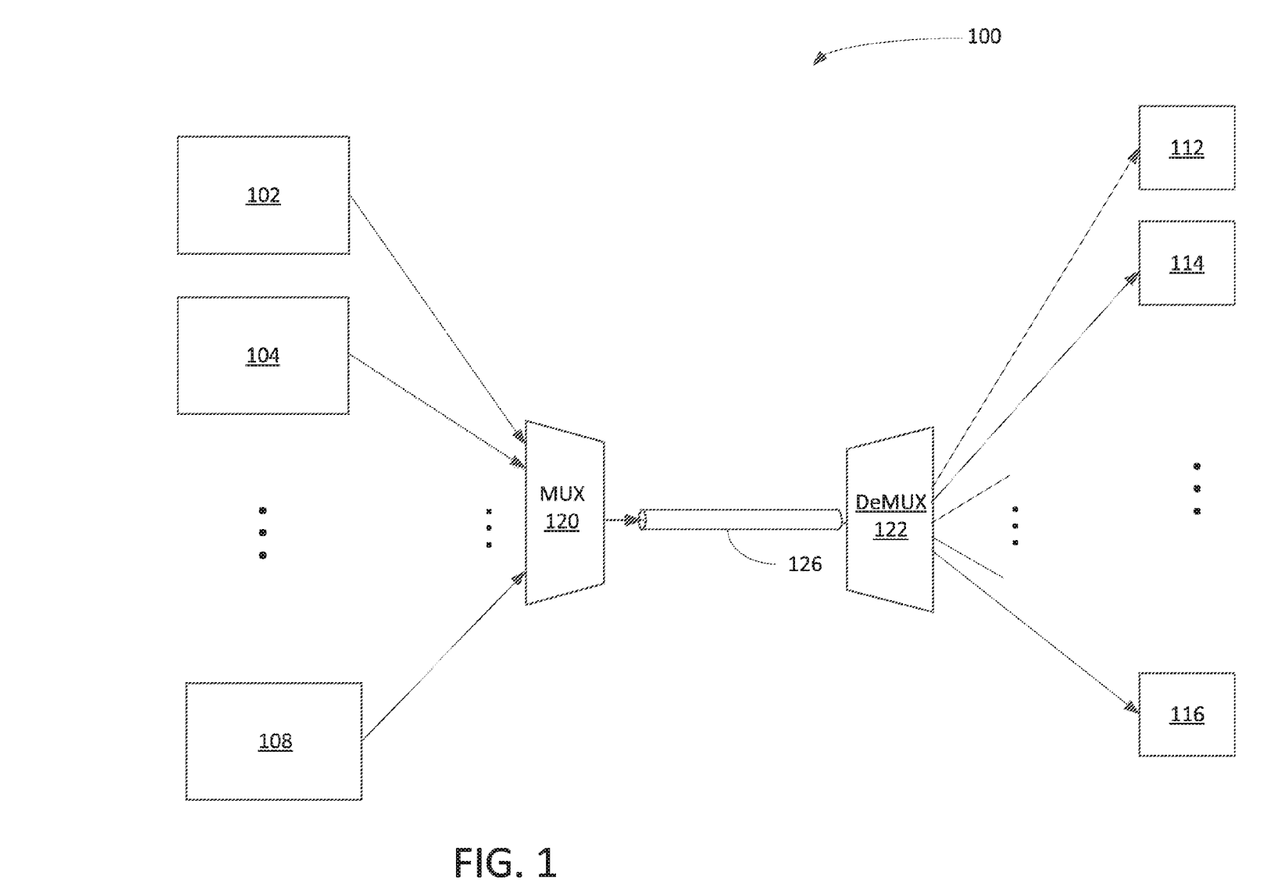
FIG. 1 is a block diagram illustrating an optical network using one or more WDM devices for transmitting optical data using a prism construction in accordance with one embodiment of the present invention.

FIG. 1 is a block diagram 100 illustrating a WDM optical network using one or more WDM devices for transmitting optical data in accordance with one embodiment of the present invention. The WDM optical network or system includes multiple transponders or optical devices 102-116, multiplexer ("mux") 120, de-multiplexer ("demux") 122, and fiber 126. The transponder, for example, is an optical device capable of sending and receiving optical data via a fiber. The optical devices includes, but not limited to, optical line terminals ("OLTs") and/or optical network units ("ONUs"). It should be noted that the underlying concept of the exemplary embodiment(s) of the present invention would not change if one or more blocks (or devices) were added to or removed from diagram 100.

The WDM network is an optical communication network capable of multiplexing multiple optical carrier ("OC") signals onto one fiber such as fiber 126 for transporting information from one or more sources to one or more destinations. To multiplex multiple OC signals, different wavelengths (i.e., colors) are multiplexed onto a single stream of optical light. The WDM network logically connects multiple nodes that are separated by geographic distances (i.e., network nodes) for network communication.

In one embodiment, mux 120 is an optical device configured to multiplexing multiple optical signals or wavelengths ("$\lambda n$") into one single light beam transmitted by a single fiber 126. Demux 122, on the other hand, is an optical device capable of separating or splitting optical signal(s) or wavelength $\lambda$ from the light beam which contains multiple optical signals or $\lambda n$. To properly extract designated wavelength(s) from the light beam, demux 122, in one aspect, includes one or more passive WDM blocks containing one or more prisms to separate optical signals represented by different $\lambda$ from the light beam. It should be noted that passive WDM block does not require a power supply to repower or refresh optical signals or light beam. To simplify forgoing discussion, the operation(s) and device(s) relating the demux are described as exemplary illustrations of the presently claimed invention.

An advantage of using a passive WDM block having a prism is that it reduces space allowing compact manufacturing and/or fabrication.

Figure 2A:
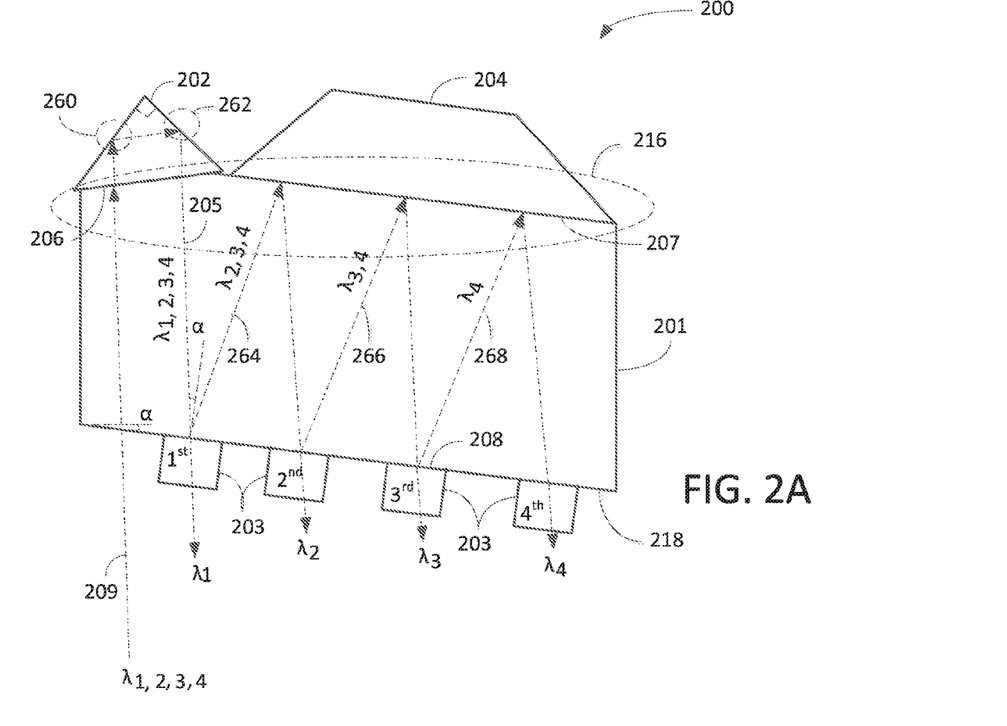
FIGS. 2A-B are block diagrams illustrating a WDM device or WDM block configured to separate multiple optical signals using a subassembly with a prism in accordance with one embodiment of the present invention.

FIG. 2A is a block diagram 200 illustrating a WDM device or WDM block configured to separate multiple optical signals using a subassembly with a prism in accordance with one embodiment of the present invention. Diagram 200 includes a subassembly 201, prism 202, mirror 204, and optical filters 203. In one aspect, center or middle of subassembly 201 is hollow used to provide free-space optical communication. It should be noted that the underlying concept of the exemplary embodiment(s) of the present invention would not change if one or more components (or elements) were added to or removed from FIG. 2A.

Subassembly 201, in one example, is an approximately rectangular structure with one side 216 separated into two portions 206-207. The two portions 206-207 are connected with an angle α for facilitating input optical beam(s) and output optical beams. In the center of subassembly 201, free-space or hollow is provided for facilitating free-space optical communication. In an alternative embodiment, subassembly 201 can be structured with clear glass or crystal whereby the hollow or free-space in the middle is not necessary because the light can pass through the glass structure without substantial loss.

Prism 202, in one embodiment, is configured to be an isosceles right triangle shape having at least six sides with one right angle connecting to two sides wherein the two joint sides are the same lengths. A function of prism 202 is to turn an input optical beam 180 degree before various wavelengths ("λ") or frequencies can be separated. In one aspect, prism 202 can be made by clear glass, crystal, and/or composite materials capable of providing intended light reflections with minimal loss. Take popular glass BK7 as an example, the two surfaces perpendicular to each other are polished without any coating, while the hypotenuse surface is with antireflection coating. Light incident to the hypotenuse surface normally and is reflected two times by two isosceles surfaces (total internal reflection). It should be noted that using a prism with isosceles right triangle is an exemplary prism structure. Other prism structures are possible depending on the applications. For example, the other prism structures include, but not limited to, acute scalene triangles, equilateral triangles, right triangle, isosceles triangle, obtuse scalene triangle, round, trapezoids, rectangle, parallelogram, pentagon, hexagon, dome shaped, and the like.

Mirror 204, in one aspect, is a light reflective plate configured to be placed or coupled to side 207 of subassembly 201. A function of mirror 204 is to receive an optical beam or light via free-space inside of subassembly 201 and subsequently guides the optical beam to an optical filter(s). To properly guide or direct an optical beam to an intended optical file, mirror 204 is structured or placed in a predefined orientation whereby the received optical beam can be properly reflected to one or more designated optical filters. It should be noted that a mirror is able to reflect light in such a way that it preserves the same or approximately the same physical characteristics of the original light.

Optical filters 203, in one embodiment, are thin film filters ("TFF") used for selectively transmitting light based on different wavelengths. A function of the optical filter is to separate or extract one particular wavelength while redirecting the remaining wavelengths in another direction. In one aspect, multiple optical filters 203 are coupled to one side 218 of subassembly 201 for accepting and/or redirecting optical beams traveling through the free-space inside of subassembly 201.

Referring back to FIG. 2A, diagram 200 can be viewed as a top view of a free-space mounting subassembly having several optical components such as prism, mirror, and optical filters 203 as a compact WDM device. Prism 202, for example, is attached to one side 206 of subassembly 201. A light 209 enters, for instance, an anti-reflective coating surface of prism 202 mounted on subassembly 201 allows the light to pass through prism 202. The light is subsequently turned 180 degrees as shown in the directional arrows in diagram 200. An advantage of a prism 202 to turn incoming light or optical beam is that it allows input fiber link and output fiber links to be situated in the same direction.

The light passes through a TFF or optical filter 203 at each output link. Each filter, in one aspect, has an anti-reflective coating surface 208 which is situated in parallel with a subassembly surface 216 of subassembly 201. The thin film filters can reflect and refract wavelengths of light as indicated in the directional path of light 209. Another surface 207 with high reflectivity coating is on the opposite side and parallel to optical filters 203. Mirror 204 is mounted behind a high-reflectivity coating surface to reflect light back into other fiber strands. Prism 202 and mirror 204 are positioned on the same side 216. In one aspect, filters 203 and mirror 204 are in parallel which will allow the light to be reflected from mirror 204 whereby allowing the light to pass through a center area of each filter and subsequently onto a strand of optical fiber.

Each component attached to subassembly 201 may be mounted using epoxy glue as long as the epoxy glue is not on the optical path. The mounting subassembly component is made of a glass substrate material or metal with a coefficient of thermal expansion similar to the filter and mirror material. As each component may expand and contract similarly during the operation such as heat generation as well as heat dissipating, the alignment of the components should remain in place.

During an operation, a light 209 containing $\lambda_{1, 2, 3, 4}$ is received by an input port, not shown in diagram 200, light 209 passes through free-space inside of subassembly 201 before it hits an interface surface of prism 202. Light 209 makes two 90-degree turns 260-262 inside of prism 202 before it leaves prism 202. After 180 degree turn, light 209 becomes light 205 and it leaves the interface surface of prism 202. Light 205 which contains $\lambda_{1, 2, 3, 4}$ travels through free-space inside of subassembly 201 and strikes first ($1^{st}$) optical filter 203. After $\lambda_1$ is extracted, the remaining portion of light 205 which contains $\lambda_{2, 3, 4}$ becomes light 264 redirected by the first optical filter towards to mirror 204. After reflecting by mirror 204, light 264 strikes second optical filter 203. After $\lambda_2$ is extracted, the remaining portion of light 264 which contains $\lambda_{3, 4}$ becomes light 266 redirected by the second ($2^{nd}$) optical filter towards to mirror 204. After reflecting by mirror 204, light 266 strikes third ($3^{rd}$) optical filter 203. After $\lambda_3$ is extracted, the remaining portion of light 264 which contains $\lambda_4$ becomes light 268 redirected by the third optical filter towards to mirror 204. After reflecting by mirror 204, light 268 strikes fourth ($4^{th}$) optical filter 203. After $\lambda_4$ is extracted, the operation ends.

One advantage of using a prim structure is that it allows input light beam(s) and output light beam(s) on the same side of WDM device.

Figure 2B:
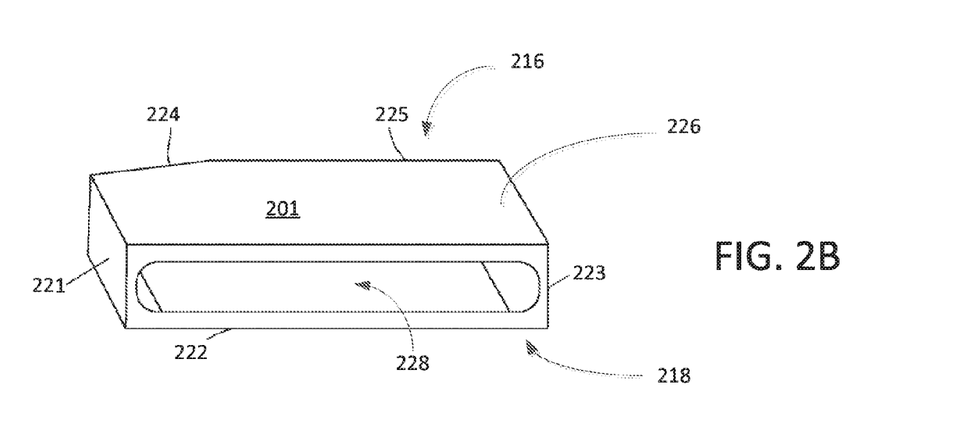

FIG. 2B is a block diagram 220 illustrating a three (3) dimensional ("3D") view of subassembly 201 showing free-space 228 in accordance with one embodiment of the present invention. Subassembly 201, in one embodiment, includes two side walls 221, 222, top surface 226, bottom plate 222, first coupling side 216, second coupling side 218, and free-space 228. First coupling side 216 further includes two portions 224-225 wherein portion 224 is used to couple a prism while portion 225 is used to couple to a mirror. In one example, portion 224 is generated upon removing or cutting at a 90 degree angle. While first coupling side 216 is used to house prism and mirror, second coupling side 218 is used to house multiple filters. Assuming the designed angle of incidence ("AOI") of the filter is alpha "α" in which the angle or α is an angle between light incident surface of mirror and light incident surface of prism which can also be viewed as 180 degrees less than alpha. An extruded cut through the entire subassembly is to allow a light beam to pass through subassembly 201 and perform a multiplexing function.

Figure 3A:
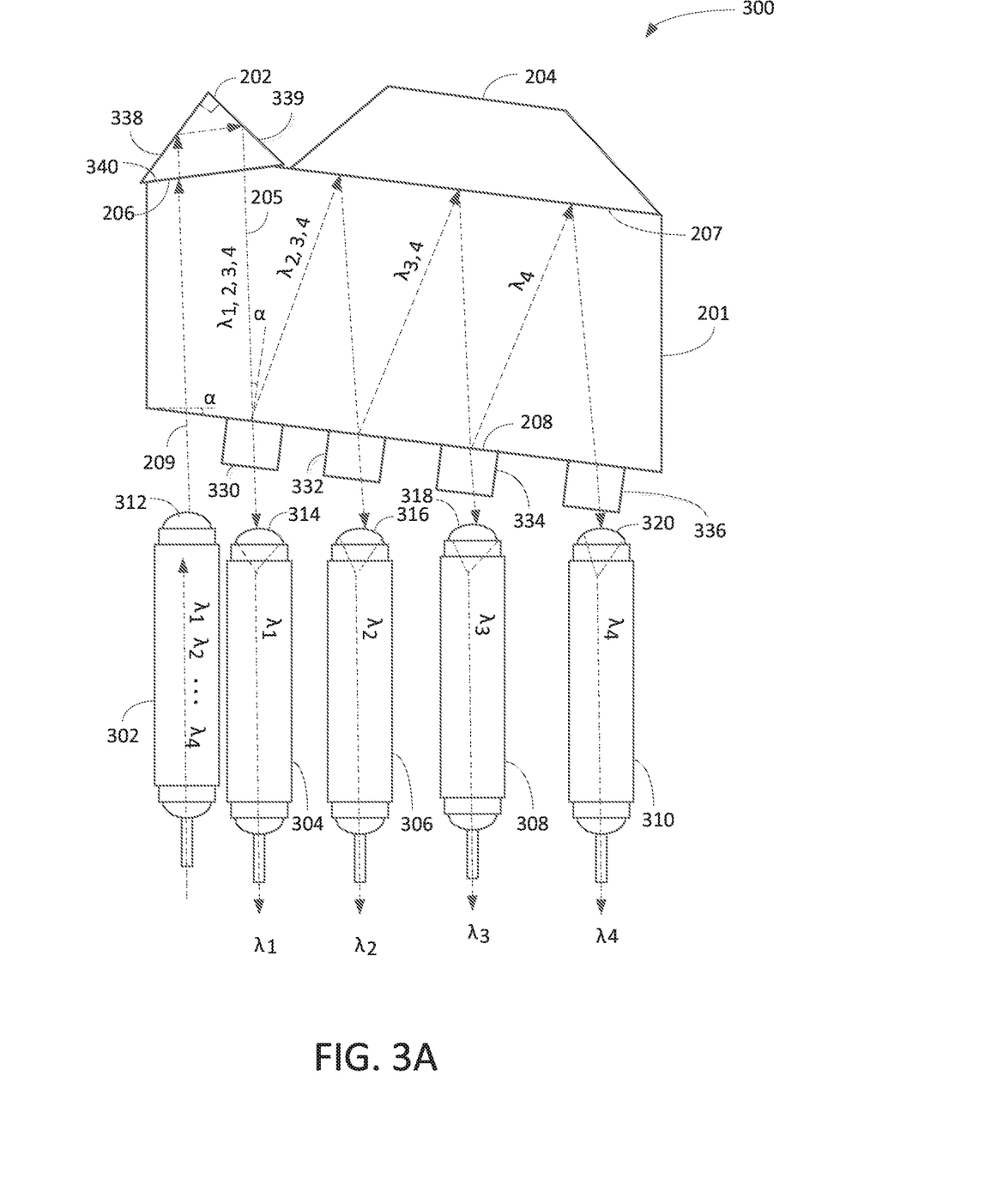
FIGS. 3A-B are block diagrams illustrating a demultiplexing WDM device having one or more collimators using a prism to facilitate separating optical signals in accordance with one embodiment of the present invention.

FIG. 3A is a diagram 300 illustrating a demultiplexing WDM device having one or more collimators using a prism for facilitating optical signal separation in accordance with one embodiment of the present invention. Diagram 300 includes a subassembly 201, prism 202, mirror 204, optical filters 203, and multiple collimators 302-310. In one aspect, center or middle of subassembly 201 is hollow used to provide free-space optical communication. It should be noted that the underlying concept of the exemplary embodiment(s) of the present invention would not change if one or more components (or elements) were added to or removed from FIG. 3A.

In one aspect, diagram 300 illustrates an optical WDM device includes an input collimator 302, prism 202, optical filter 330, and subassembly 201. Input collimator 302 is configured to receive an optical beam 209 containing a set of wavelengths (λ) and facilitates optical beam 209 to travel through free-space. Prism 202 having an interface surface orientated in such a way to receive optical beam 209 from input collimator 302 uses at least two (2) surfaces such as surfaces 338-339 to generate a first optical beam 205 traveling in opposite direction of optical beam 209. It should be noted that two side surfaces 338-339 are coated with anti-reflective coating and are connected with a ninety (90) degree angle.

Optical filter 330, in one embodiment, is configured to have an optical receiving surface which is situated at a predefined angle with respect to interface surface 340 of prism 202 for facilitating frequency separation. A function of optical filter such as filter 330 or 332 is to extract a first wavelength ("$\lambda_1$") from the wavelengths. $\lambda_1$ is subsequently formed as a first light signal. A second beam is then formed by the remaining wavelengths of optical beam 205. Note that an optical filter is a thin-film filter capable of allowing a predefined wavelength to travel in one direction and allowing the remaining wavelengths of optical beam to travel in a second direction.

First collimator 302 is configured to receive the first light signal with the $\lambda_1$ from the first optical filter wherein the first collimator includes a fiber pigtail and a collimator lens. The fiber pigtail and the collimator lens are enclosed by a glass tube configured to transmit optical signals. Mirror 204 is coupled to subassembly 201 and is configured to reflect optical signals with a predefined reflective angle.

The optical WDM device further includes a second optical filter 332 coupled to subassembly 201 and configured to separate a second wavelength ("$\lambda_2$") from the second optical beam to form second light signal with $\lambda_2$. A third optical beam is generated with the remaining wavelengths of the second optical beam. The optical WDM device includes a second collimator coupled to the second optical filter and configured to receive the second light signal with the $\lambda_2$.

Referring back FIG. 3A, diagram 300 illustrates a WDM device having an input port and four output ports aligned at the same side of the device. Five collimators 302-310 are used to implement 1-4 (one input and four outputs) demultiplexing function. A benefit of using collimator is to extend optical working distance.

Figure 3B:
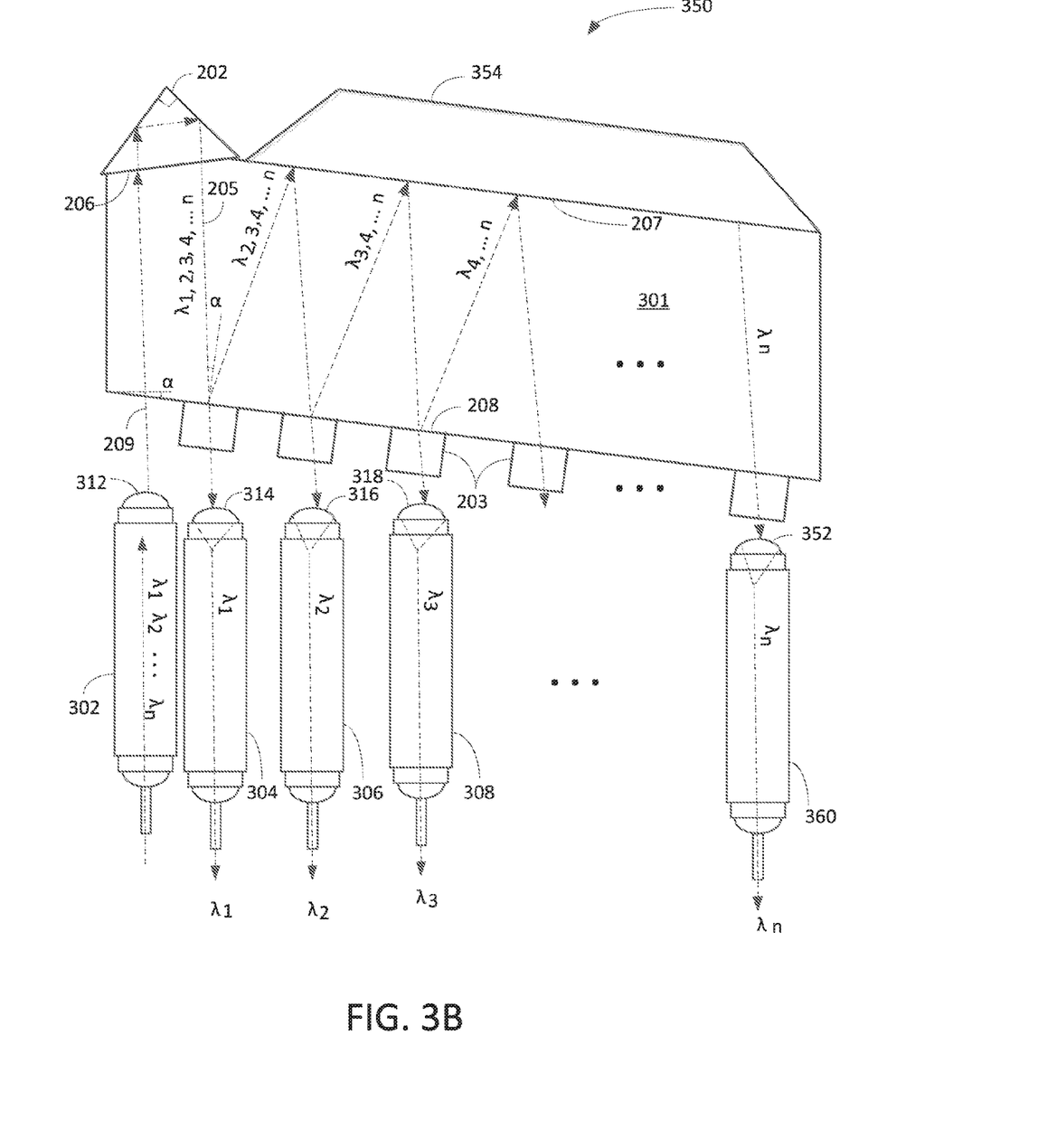

FIG. 3B is a block diagram 350 illustrating a demultiplexing WDM device having one or more collimators using a prism to facilitate separating optical signals in accordance with one embodiment of the present invention. Diagram 350 is similar to diagram 300 shown in FIG. 3A except that diagram 350 shows additional output links or ports. In addition to additional collimators, additional optical filters are also employed to separate different wavelengths from the light beam. Depending on the applications, additional outputs can be added.

Figure 4A:
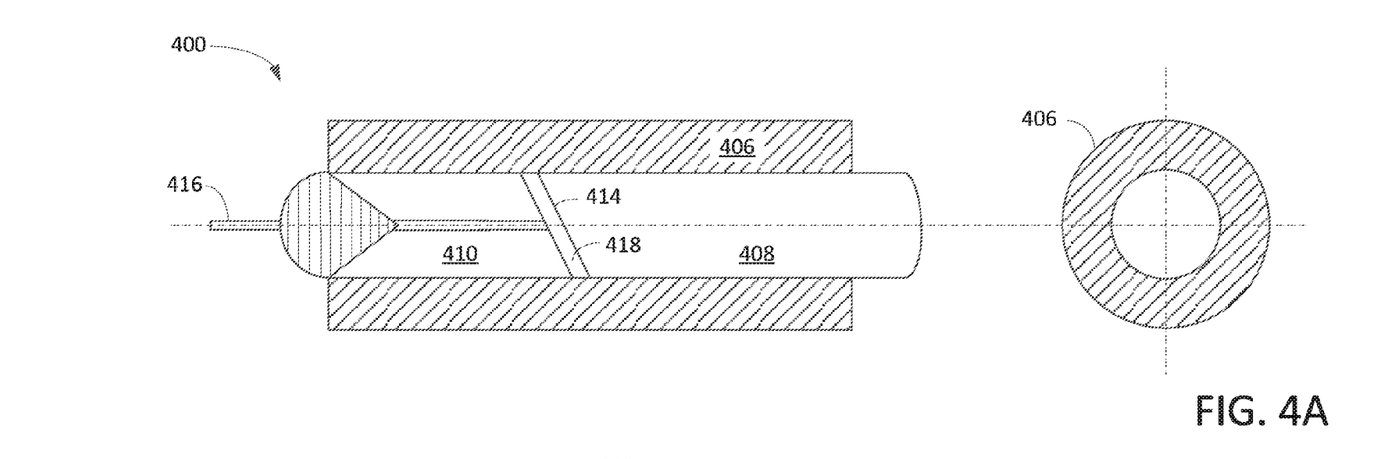
FIGS. 4A-B are block diagrams illustrating exemplary collimators used with WDM device(s) in accordance with one embodiment of the present invention.
Figure 4B:
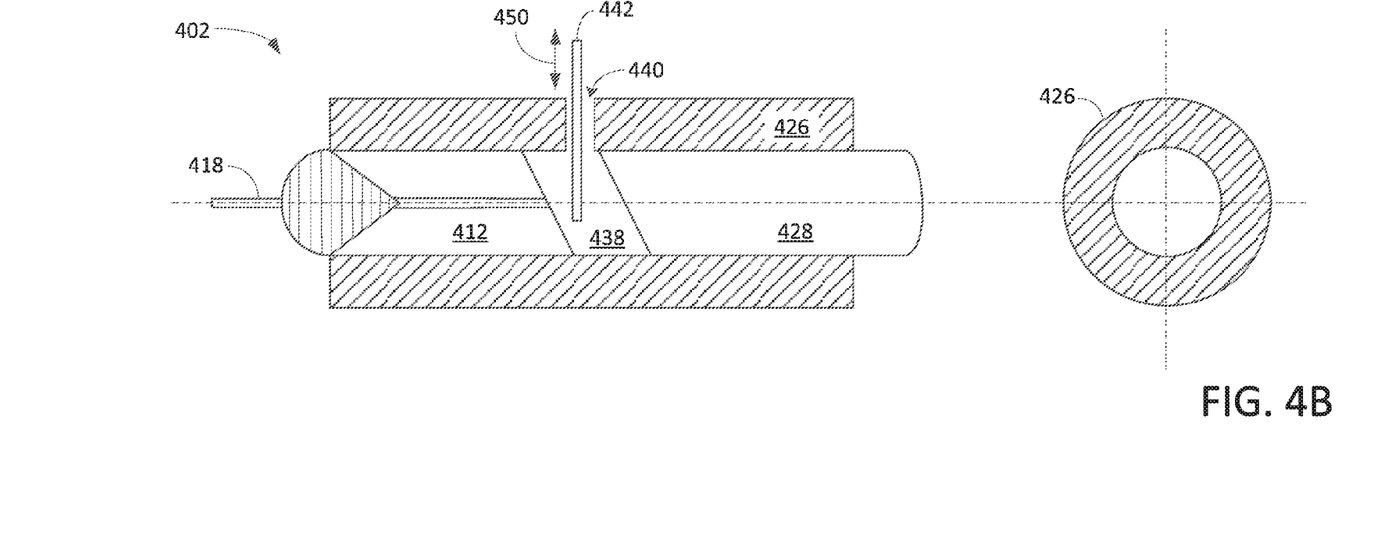

FIGS. 4A-B are block diagrams 400-402 illustrating exemplary collimators used with WDM device(s) in accordance with one embodiment of the present invention. Collimator 400 includes a lens 408, a fiber pigtail 410, a gap 418, and a tube 406. Gap 418, in one example, is a gap with an eight (8) degree angle for reducing optical or light return loss. Collimator 400 further includes a fiber 416 which is used to receive or transmit light between the port and lens 408. Tube 406 can either be made of glass or metal depending on the application. It should be noted that the underlying concept of the exemplary embodiment(s) of the present invention would not change if one or more components (or elements) were added to or removed from diagram 400.

Collimator 402, in one embodiment, includes a lens 428, a fiber pigtail 410, a gap 438, and a tube 426. Gap 438, in one example, is a gap with a larger space with eight (8) degree angle wall for reducing optical or light return loss. In one aspect, collimator 402 includes an adjustable opening 440 that allows a thin glass 442 to be inserted into gap 438 for adjusting the focal point. Tube 426 can either be made of glass or metal depending on the application.

Collimator 400 or 402 which is also known as mini-fiber collimator includes lens 408 or 428 and fiber pigtail 410 that can be glued into a glass/metal tube 406 or 426. The adjustment of gap such as gap 438 between fiber end 416 and lens 428 can change the beam collimation. It should be noted that light beams maintain collimation for a certain distance which is called working distance. If a pair of collimators (as emitting and receive light) separation within the working distance, the coupling loss is relatively small. Beyond the working distance, the coupling loss will increase substantially. Note that low or minimal optical loss is desirable. It should be noted that working distance can be adjusted in certain range, but it eventually limited by the lens (both the diameter and thickness). For all compact devices, small size is required. For example, a lens with diameter of 1 mm (millimeter) or less has the longest working distance about 60-80 mm.

Figure 5A:
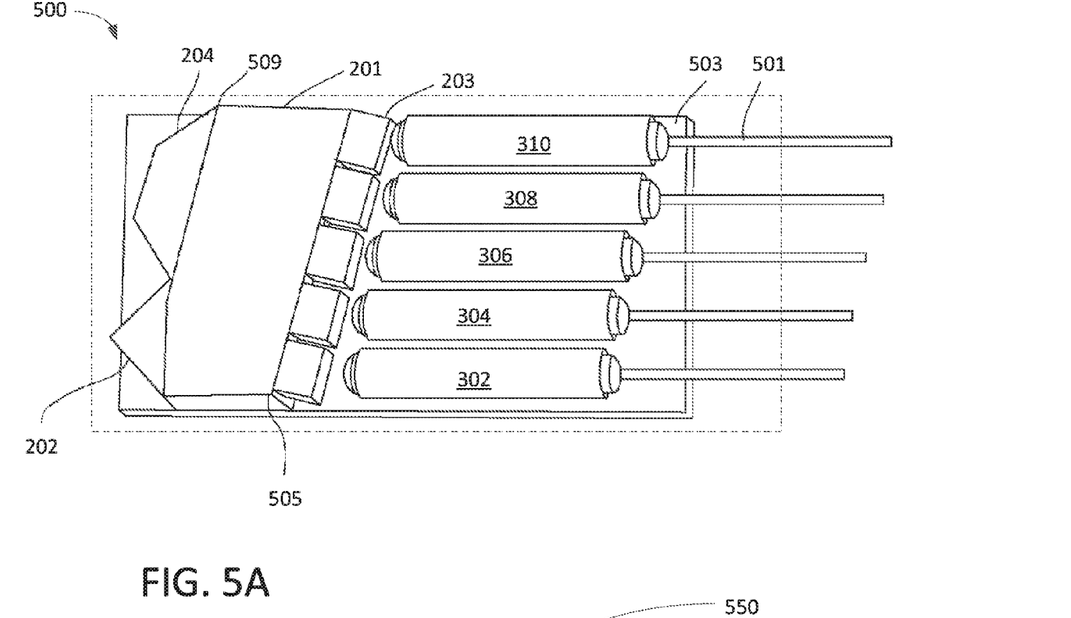
FIGS. 5A-B are diagrams illustrating a WDM device containing assembly, prism, and collimators in accordance with one embodiment of the present invention.

FIG. 5A is a diagram 500 illustrating a WDM device containing subassembly, prism, and collimators in accordance with one embodiment of the present invention. Diagram 500 illustrates a base member or plate 303 configured to house subassembly 201 mounted prism 202, mirror 204, and optical filters 203. In one aspect, optical filters 203 are aligned with five collimators 302-310 wherein collimator 302 is the input collimator. It should be noted that the underlying concept of the exemplary embodiment(s) of the present invention would not change if one or more components (or elements) were added to or removed from diagram 500.

Diagram 500 illustrates a top view of WDM device arranged in a specific configuration. A flat surface base member allows all the optical components to be mounted on the same plane. Multiple collimators 302-310 are positioned in a parallel array along the same plane of a base member 503. Subassembly 201 is also positioned along the flat surface of base member 503 and thin film filters 203 are positioned in alignment with collimators 302-310 as well as subassembly 201. With aligned subassembly 201 to base member 503 using side walls 505, mirror 204 and filters 203 are properly mounted and orientated in such a way that the light beam can pass through prism 202 and forward individual wavelength to individual fiber strand after demultiplexing the input light. It should be noted that optical subassembly assists compact configuration for positioning optical components in a compact WDM device.

Figure 5B:
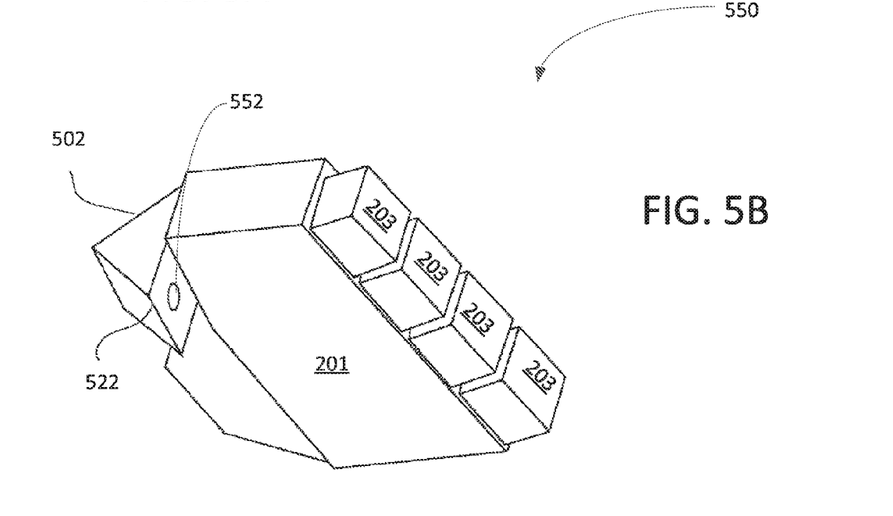

FIG. 5B is a 3D diagram 550 illustrating a WDM device containing subassembly 201, prism 502, and optical filters 203 in accordance with one embodiment of the present invention. Diagram 550 shows an alternative configuration for attaching prism 502 to subassembly 201 in which a portion of prim 522 is protruded over the edge of subassembly 201 for receiving input optical beam. In one aspect, the input beam does not travel through inside of subassembly 201. Instead, the input optical beam or incoming light travels outside of subassembly 201 and arrives at an input lens or opening 552 of prism 502. It should be noted that the underlying concept of the exemplary embodiment(s) of the present invention would not change if one or more components (or elements) were added to or removed from diagram 550.

To reduce physical dimension of WDM device, the right angle prism may be rotated 90 degrees to compress the width of the assembly as shown in diagram 550. With rotated configuration, the collimators can be positioned in two layers as the input light beam can pass through a collimator on top row while output collimators can receive light through bottom row. In one aspect, the two angled surfaces of prism 502 is able to make a light beam to turn 180 degree from the top layer collimator and output via bottom collimators. Prism 502 has the same anti-reflective coating along the flat hypotenuse surface which is mounted to subassembly 201.

Figure 6A:
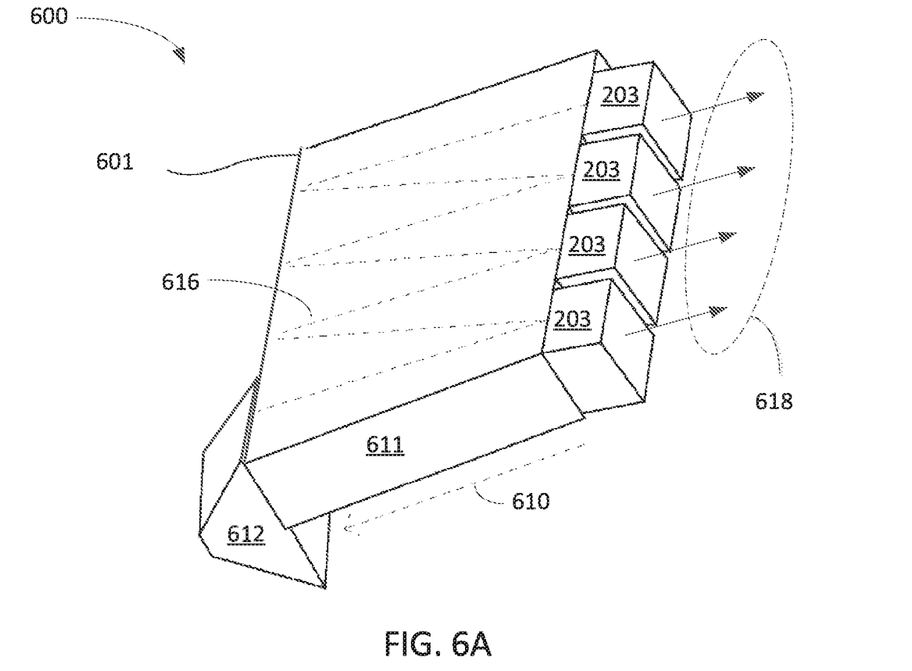
FIGS. 6A-B are diagrams illustrating a subassembly structure mounted with a prism in accordance with one embodiment of the present invention.

FIG. 6A is a 3D diagram 600 illustrating a subassembly 201 mounted with a prism 612 in accordance with one embodiment of the present invention. Diagram 600 is similar to diagram 550 except that diagram 600 shows a different view. In one aspect, subassembly 611 which is also known as hybrid subassembly can be a metal structure to achieve desirable angles and flatness. Unlike assembly 201 illustrated in FIG. 2A, the edge coupling prism of subassembly 611 does not have an angle with respect to the portion coupling to the mirror. Incoming light or optical beam 610 is configured to travel at different layer as output signals. It should be noted that, for a CDM device, the machined tolerances are adequate and since the channel separation for wavelengths is wider than a WDM device. For a WDM device, closely arranged channel separation requires glass mounting block which is a glass or crystal material with finer flatness for achieving parallelism. Note that the mirror and filters are positioned parallel to one another in a precise orientation for reflecting output light into separate fiber links 618.

Figure 6B:
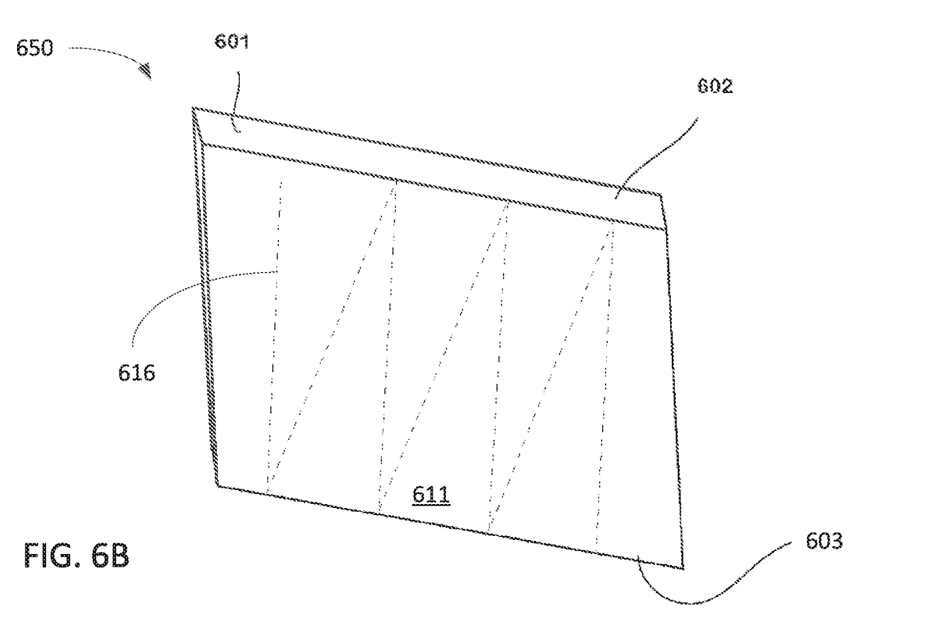

FIG. 6B is a diagram 650 illustrating a subassembly structure providing prism mounting place 601 and mirror mounting place 602. Note that surfaces on a hybrid subassembly are coated with anti-reflection coating which is highly reflectivity for clarity. The hybrid subassembly is a glass block material with polished surfaces on both sides. In 601, the anti-reflective coating allows a light beam to pass through the surfaces and bend 180 degrees as a prism (not shown) is mounted on this surface. The physical length of the WDM device is shortened as the light beam takes a quick turn and passes back to another anti-reflective surface 603 on the opposite side of the prisms. Mounted to the surface of 603 are filters (not shown) which can reflect wavelengths or pass wavelengths of light through collimators and on to optical fiber strands (not shown). The wavelengths that are reflected bounce back to a reflectivity surface shown in 602 while a mirror (not shown) is positioned behind the highly reflective surface to reflect all light back on to other filters.

Figure 7:
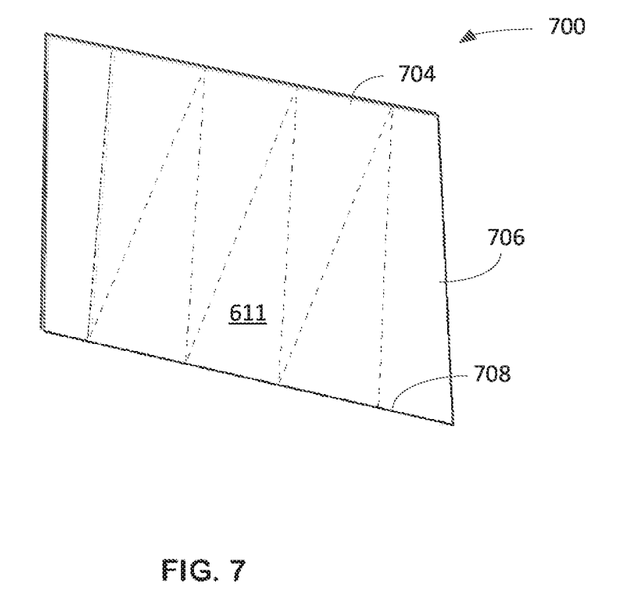
FIG. 7 is a diagram illustrating a configuration of subassembly with a predefined angle in accordance with one embodiment of the present invention.

FIG. 7 is a diagram 700 illustrating a configuration of subassembly 611 with a predefined angle in accordance with one embodiment of the present invention. The filters and mirror are positioned in parallel and the angle alpha is a cut angle of glass block which is equal to the designed angle of incidence for the air-type filter. When the optical components are mounted to the hybrid subassembly in the desired positions, each component is mechanically secured with epoxy and the configuration of optical components ensures the multiplexing process in a compact WDM device.

Figure 8:
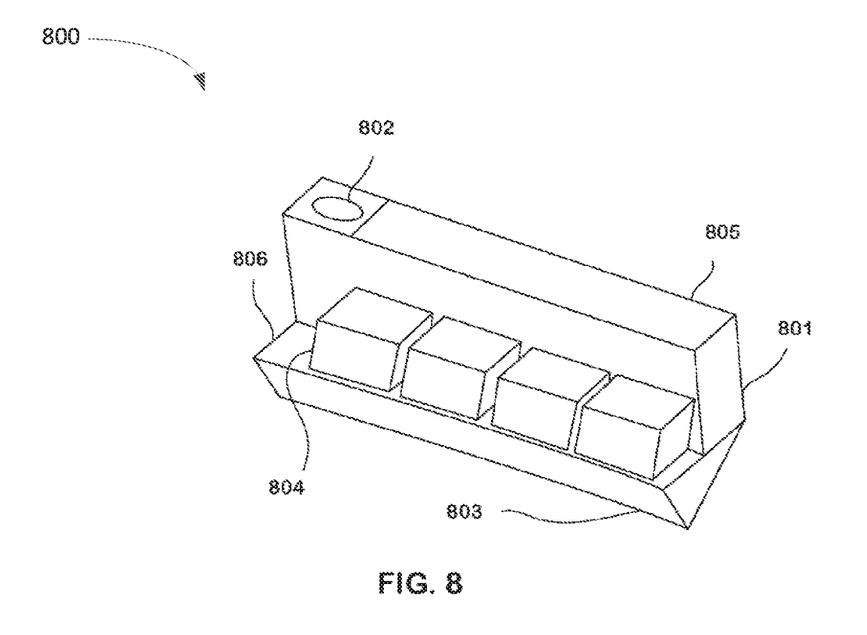
FIG. 8 is an alternative configuration of subassembly mounted with a prism in accordance with one embodiment of the present invention.

FIG. 8 is a 3D diagram 800 illustrating an alternative configuration of subassembly with a prism in accordance with one embodiment of the present invention. Diagram 800 shows another view of the hybrid subassembly with optical components mounted in an orientation to reduce physical size of a WDM device. The glass block 801 is reconfigured or re-orientated in such a way that allows light from first collimator (not shown) in one layer of assembly to enter from area of glass block with AR coating 802. The light can be reflected two times via prism 803 with two angled surfaces. Prism 803, in one embodiment, is rotated 90 degrees to save space and the hypotenuse side of the prism is mounted against a surface of glass block using epoxy glue. The hypotenuse surface of the prism has an anti-reflective coating 806 such that when light from input collimator passes through glass block and through prisms, the anti-reflective coating surface allows the light to pass into thin film filters 804. The reflected light from the first filter goes back and is internally reflected two times before finally hitting the back surface 805 of glass block 801. Glass block 801 has a reflectivity coating capable of reflecting all light. The relatively high-reflectivity coating reflects light back to second filter and third filter and so on in Layer 2. Each of the collimators (not shown) on the receiving end are positioned in line with the filters in Layer 2 to collimate light before going into an optical fiber strand. The filters may need to be placed in parallel along the back side of glass block to keep all filters seeing the same AOI of light. In one example, glass block has a cut angle for prism 803 to be position in accordance to the filters.

Figure 9:
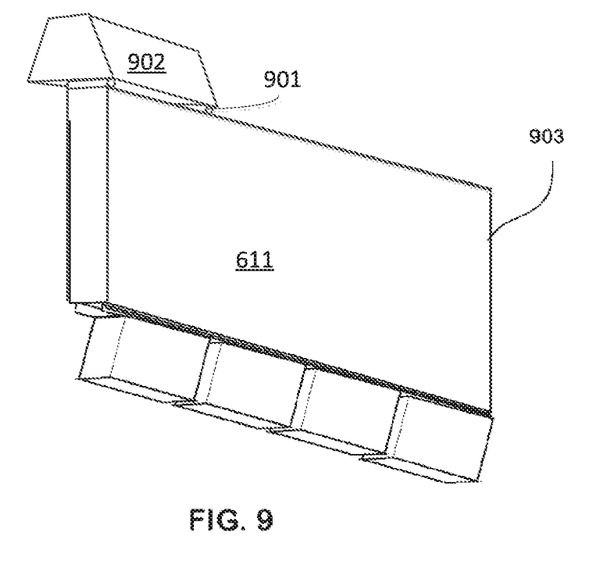
FIGS. 9-10 are diagrams illustrating mechanism(s) of anchoring a prism to a subassembly in accordance with one embodiment of the present invention.
Figure 10:
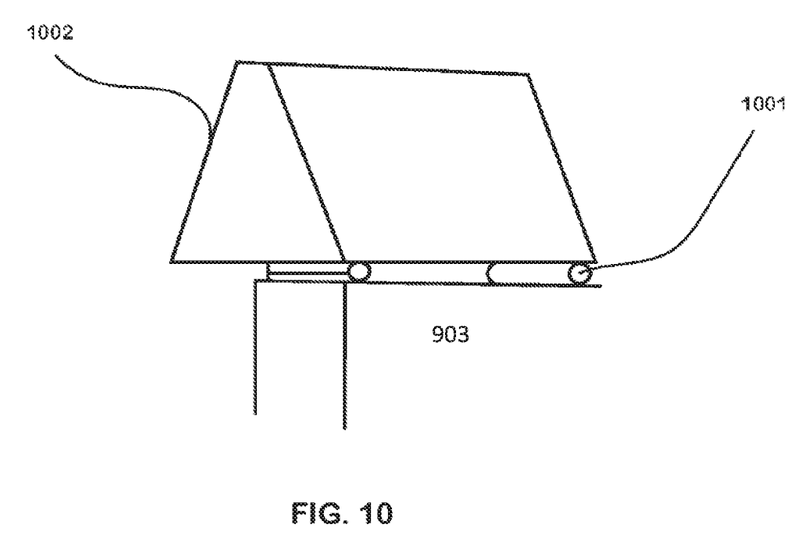

FIGS. 9-10 are diagrams illustrating mechanism(s) of anchoring a prism to a subassembly in accordance with one embodiment of the present invention. FIG. 9 illustrates hybrid subassembly 611 which illustrates a method of assembling or attaching optical components to a glass block. It is preferred that no epoxy is used in the optical path of the light beam when optical components are mounted to a glass block. If the optical components are directly attached to glass block 903, the epoxy glue may spread across the surface areas and impede in the optical light path. In one embodiment, a fiber rod 901 is used as a spacer between optical components such as between prism 902 and glass block 903, a fiber rod 901 with a spacer to provide a buffer. Rod 901, in one example, can be a portion of a standard fiber and ideally has a diameter of 125 micrometers. Also by using a fiber rod and spacer, the epoxy will only be limited to the surface of the rod area and the optical path of the light beam will be epoxy free.

FIG. 10 illustrates an enlarged or explored view of coupling structure between prism 1002 and glass block 903 using a rod or rods 1001 in accordance with one embodiment of the present invention. In the enlarged view, the fiber rod 1001 is positioned at the edge of prism 1002 and is glued to the hybrid subassembly 903 to realize an epoxy free optical path for the light beam. Fiber rod 1001 can also be used as a spacer to connect to optical components to the subassembly 903.

The exemplary embodiment of the present invention includes various processing steps, which will be described below. The steps of the exemplary embodiment of the present invention may be embodied in machine or computer executable instructions. The instructions can be used to cause a general purpose or special purpose system, which is programmed with the instructions, to perform the steps of an exemplary embodiment of the present invention. While embodiments of the present invention will be described with reference to the DWDM network, the method and apparatus described herein is equally applicable to other network infrastructures or other data communications environments.

Figure 11:
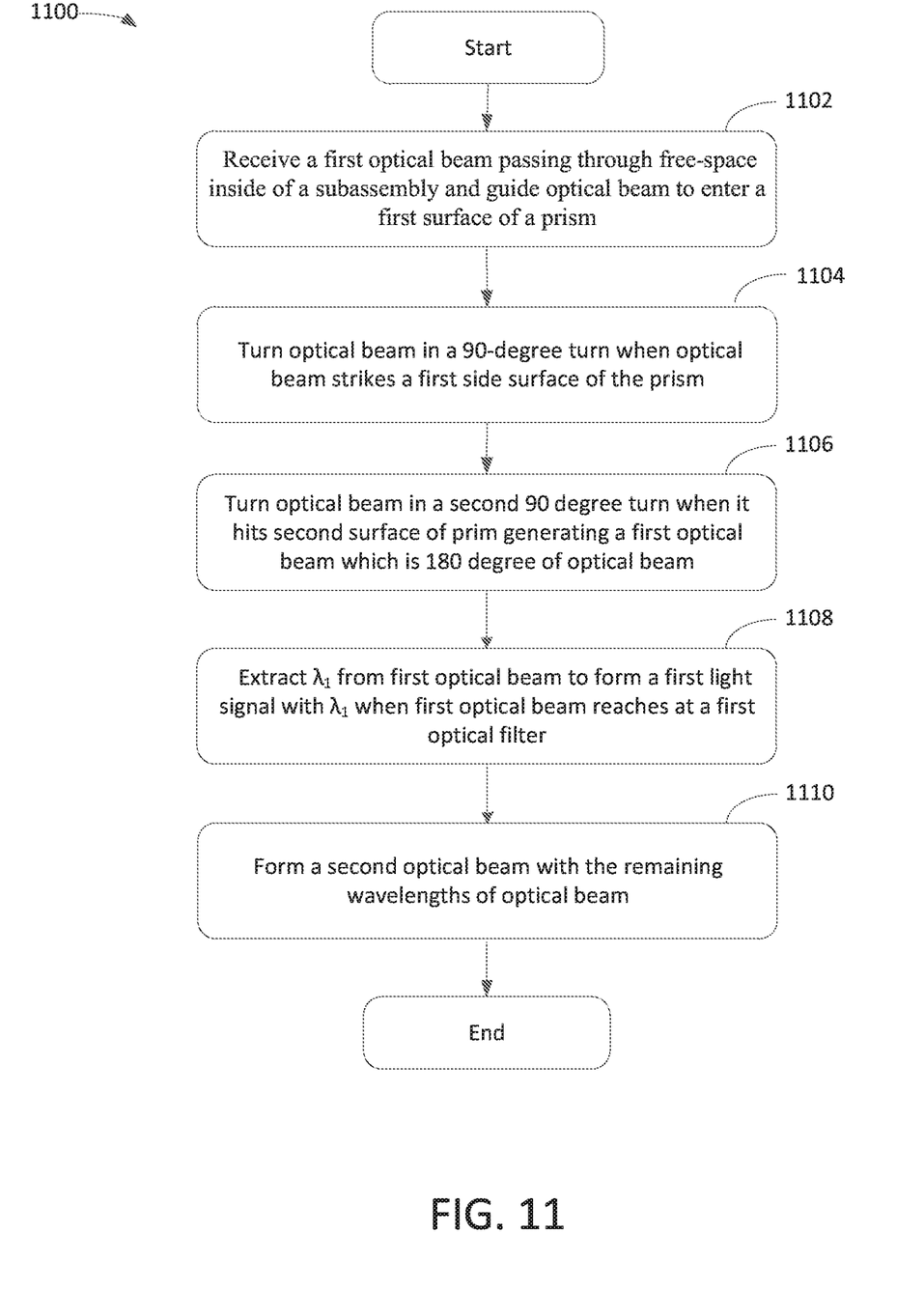
FIG. 11 is a flowchart illustrating an exemplary process of separating a specific optical wavelength from a light beam using a prism in accordance with one embodiment of the present invention.

FIG. 11 is a flowchart 1100 illustrating an exemplary process of separating a specific optical wavelength from a light beam using a prism in accordance with one embodiment of the present invention. At block 1102, a process capable of demultiplexing an optical light beam for a WDM device receives an optical beam passing through free-space inside of a subassembly and guiding the optical beam to enter a first surface of a prism coupled with the subassembly.

At block 1104, the optical beam is turned in a first ninety (90) degree turn when the optical beam strikes a first side surface of the prism, and subsequently generates a 90-degree optical beam traveling toward a second surface of the prim.

At block 1106, upon hitting the second surface of the prim, the 90-degree optical beam is turned again in a second ninety (90) degree turn and subsequently generates a first optical beam which is a 180 degree turned around optical beam. The first optical beam is allowed to leave the prism and travels through free-space towards the first optical filter which is aligned to the prism with a predefined angle via free-space facilitated by the subassembly.

At block 1108, a first wavelength ("$\lambda_1$") is extracted from the first optical beam to form a first light signal with $\lambda_1$ when the first optical beam reaches at the first optical filter. The first light signal is allowed to pass through the first optical filter reaching to a first collimator. The first light signal is forwarded by the first collimator to a first port of the WDM device.

At block 1110, a second optical beam is formed using the remaining wavelengths of the first optical beam. After redirecting the second optical beam from the first optical filter towards a mirror coupled to the subassembly via free-space, a second wavelength ("$\lambda_2$") is extracted from the second optical beam when the second optical beam reaches to the second optical filter. A third optical beam is subsequently formed using the remaining wavelengths of the second optical beam. Once allowing the second wavelength ("$\lambda_2$") to pass through the second optical filter and to reach a second collimator, the second wavelength ("$\lambda_2$") is forwarded by the second collimator to a second port of the WDM device. After redirecting the third optical beam from the second optical filter towards the mirror via free-space facilitated by the subassembly, a third wavelength ("$\lambda_3$") is extracted from the third optical beam when the third optical beam is reaches at the third optical filter. A fourth optical beam is formed with the remaining wavelengths of the third optical beam. Upon allowing the third wavelength ("$\lambda_3$") to pass through the third optical filter and to reach to a third collimator, the third wavelength ("$\lambda_3$") is forwarded by the third collimator to a third port of the WDM device. Once redirecting the fourth optical beam from the third optical filter towards the mirror via free-space facilitated by the subassembly, a fourth wavelength ("$\lambda_4$") is extracted from the fourth optical beam when the fourth optical beam, reflected by the mirror, reaches to the fourth optical filter. After allowing the fourth wavelength ("$\lambda_4$") to pass through the fourth optical filter reaching to a fourth collimator, the fourth wavelength ("$\lambda_4$") is forwarded by the fourth collimator to a fourth port of the WDM device.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. An optical wavelength-division multiplexing ("WDM") device, comprising:
   an input collimator configured to receive an optical beam containing a plurality of wavelengths and facilitate the optical beam to travel through free-space;
   a prism with an interface surface optically coupled to the input collimator and utilizing at least two (2) surfaces to generate a first optical beam traveling in opposite direction of the optical beam in response to the optical beam;
   a first optical filter having an optical receiving surface which is situated at a predefined angle with respect to the interface surface of the prism for facilitating frequency separation and configured to extract a first wavelength ("$\lambda_1$") from the plurality of wavelengths to form a first light signal with $\lambda_1$ and form a second optical beam with remaining wavelengths of the first optical beam;
   a first collimator optically coupled to the prims and configured to receive the first light signal with the $\lambda_1$ from the first optical filter;
   a subassembly coupled to the prism and configured to facilitate free-space optical communication between the prism and optical filters;
   a mirror coupled to the subassembly and configured to reflect optical signals with a predefined reflective angle; and
   a fiber rod coupled between the prism and the subassembly performing a function of coupling the prism to the subassembly.

2. The optical WDM device of claim 1, further comprising a second optical filter coupled to the subassembly and configured to separate a second wavelength ("$\lambda_2$") from the second optical beam to form second light signal with $\lambda_2$ and form a third optical beam with remaining wavelengths of the second optical beam.

3. The optical WDM device of claim 2, further comprising a second collimator coupled to the second optical filter and configured to receive the second light signal with the $\lambda_2$.

4. The optical WDM device of claim 1, wherein the first optical filter is a thin-film filter capable of allowing a predefined wavelength to travel in one direction and allowing remaining wavelengths of the first optical beam to travel in a second direction.

5. The optical WDM device of claim 1, wherein the first collimator includes a fiber pigtail and a collimator lens wherein the fiber pigtail and the collimator lens are enclosed by a glass tube configured to transmit optical signals.

6. The optical WDM device of claim 1, wherein at least two side surfaces of the prism are coated with anti-reflective coating and two ends of the two side surfaces are connected with a ninety (90) degree angle.

7. A multiport free-space WDM system capable of facilitating optical communication comprising the optical WDM device of claim 1.

* * * * *